United States Patent [19]

Nakagawa

[11] 4,006,374
[45] Feb. 1, 1977

[54] ELECTRIC MICRO MOTOR FOR A TIMEPIECE
[75] Inventor: Yasuichi Nakagawa, Tokyo, Japan
[73] Assignee: Kabushiki Kaisha Daini Seikosha, Japan
[22] Filed: Feb. 19, 1975
[21] Appl. No.: 550,929
[52] U.S. Cl. .................. 310/40 MM; 310/156; 58/23 D
[51] Int. Cl.² .................... H02K 21/12
[58] Field of Search ............ 310/40 MM, 156, 83, 310/51, 89, 46, 194, 162, 163, 164, 257, 258, 259, 49; 58/23 D; 324/146

[56] References Cited
UNITED STATES PATENTS

| 3,732,685 | 5/1973 | Haydon | 58/23 D |
| 3,737,695 | 6/1973 | Kilmer | 310/162 |
| 3,747,320 | 7/1973 | Wuffray | 58/23 D |
| 3,803,430 | 4/1974 | Da Costa | 58/23 D |

FOREIGN PATENTS OR APPLICATIONS 1,096,482  1/1961  Germany .................. 310/40 MM Primary Examiner—R. Skudy
Attorney, Agent, or Firm—Robert E. Burns; Emmanuel J. Lobato; Bruce L. Adams

[57] ABSTRACT

An electric micro motor for a timepiece comprises a rotor having a portion formed of a permanent magnet and a pair of magnetic stator pieces disposed in spaced-apart relationship with the rotor disposed therebetween. A pair of non-magnetic coupling members couple together the stator pieces and rotatably support the rotor. The rotor-stator pieces-coupling members assembly is contained within a magnetic cylinder so as to shield the micro motor from external magnetic noise.

5 Claims, 6 Drawing Figures 4,006,374

ELECTRIC MICRO MOTOR FOR A TIMEPIECE

BACKGROUND OF THE INVENTION

In the conventional type of timepiece and watch, the motor rotor is often times influenced by external magnetic noise because said rotor is composed of a permanent magnet. A case ring for coupling a watch movement and case of magnetic material such as pure iron, but said movement is not necessarily pertinent to said magnetic influence. Another way, said outer magnetic influence is prevented by installing the magnetic member into the back case of said watch.

OBJECT OF THE INVENTION

The present invention aims at eliminating the above noted draw, and therefore it is the primary object of the present invention to provide a new electric micro motor for a timepiece, wherein the entire electric motor is enclosed within a magnetic member to obtain a normal rotation of the rotor without the influence of external magnetic noise.

SUMMARY OF THE INVENTION

According to the present invention, there is provided an electric micro motor for a timepiece comprising a rotor composed of a permanent magnet, and a pair of stators composed of magnetic material and having wound thereon a drive coil, said stators being disposed on opposite side portions of said rotor. A cylindrical magnetic member encloses said rotor and stators and completes the magnetic circuit, said magnetic member effectively shielding the motor from external magnetic disturbances.

BRIEF DESCRIPTION OF THE DRAWINGS

The above mentioned and further objects, features and advantages of the present invention will become more obvious from the following description when taken in connection with the accompanying drawings, which shows one preferred embodiment of the invention, and wherein.

DETAILED DESCRIPTION OF THE INVENTION

Figure 1:
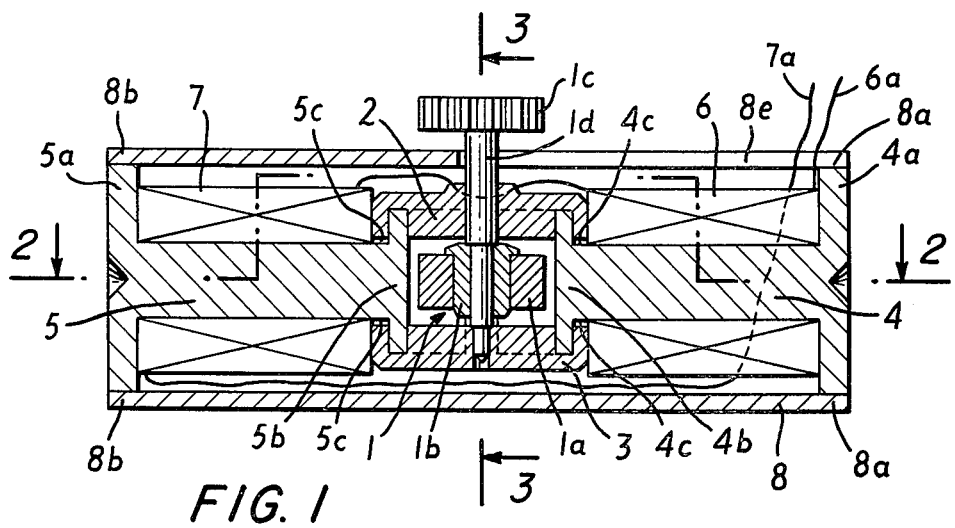
FIG. 1 shows the cross sectional view of the micro motor of this invention.
Figure 2:
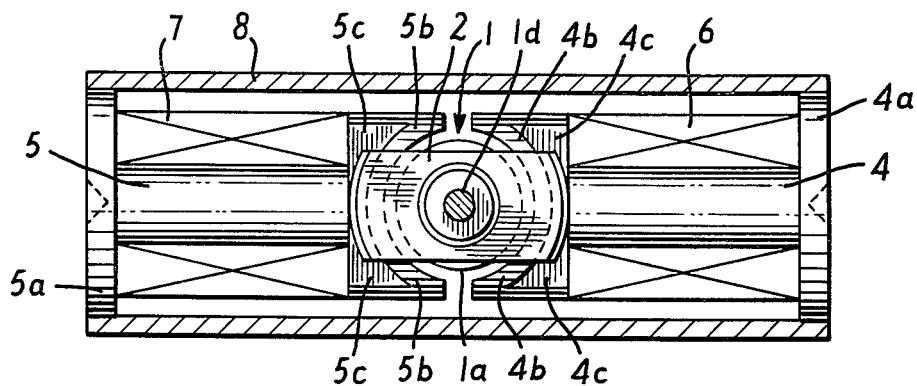
FIG. 2 shows the cross sectional view of the micro motor taken along line 2—2 in FIG. 1.
Figure 3:
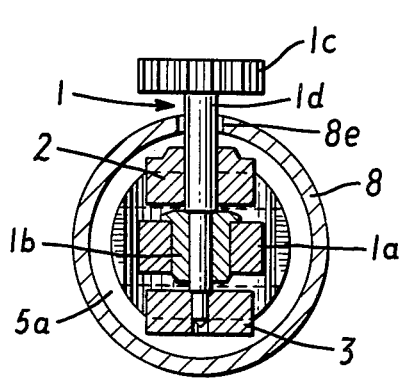
FIG. 3 shows the cross sectional view of the micro motor taken along the line 3—3 in FIG. 1.
Figure 4:
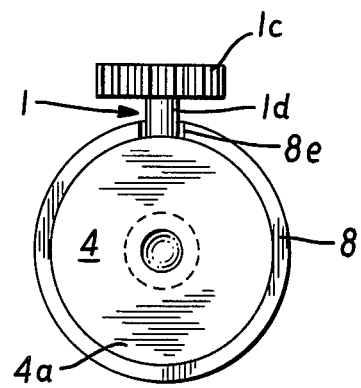
FIG. 4 shows the side view according to FIG. 1.
Figure 5:
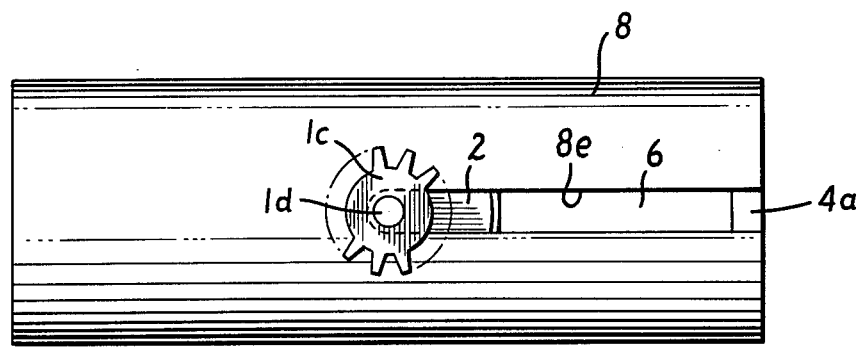
FIG. 5 shows a top plan view of the micro motor of FIG. 1.

Referring now to the accompanying drawings, one embodiment of this invention will be explained. In FIG. 1 to FIG. 6, numeral 1 is a rotor comprised of a permanent magnet 1a, bush 1b, pinion 1c and rotor shaft 1d. Said bush 1b is mounted on a stepped portion of the shaft 1d and couples said permanent magnet 1a to the rotor shaft so that, said pinion gear 1c is rotatably mounted to transmit the rotary power of said rotor to the gear train (not shown).

Figure 6:
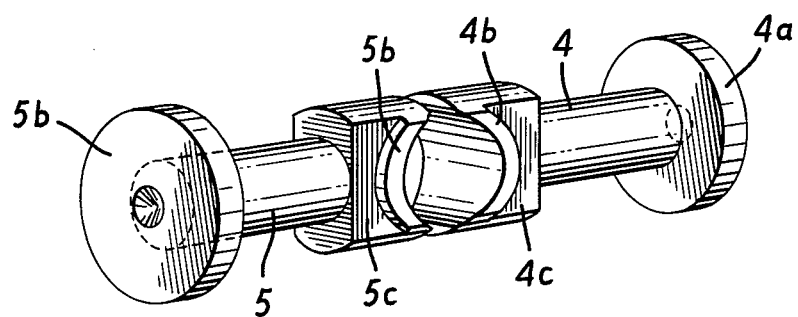
FIG. 6 shows a perspective view of the stator.

A pair of coupling members 2 and 3 made of non-magnetic material are coupled to the step portions 4c and 5c of stators 4 and 5. The stators 4 and 5 each comprise elongated bodies having one concavely curved end portion and one flat end portion which has a circular profile, as best seen in FIG. 6, and the stators are made of magnetic material, and the coupling members 2 and 3 are disposed at each coaxial end portion of said rotor 1. The coupling members 2 and 3 also function as for rotatably mounting the rotor bearings. Numerals 6 and 7 indicate drive coils wound on said stators 4 and 5 and terminating in lead terminals 6a and 7a.

Numeral 8 is a cylindrical magnetic enclosure member which is fixed to both end portions 4a and 5a of said stators 4 and 5 such that the magnetic circuit of the electric motor is closed by said cylindrical magnetic member 8 and said stators 4 and 5.

An electric timepiece incorporating said above electric motor can be driven by a battery. The standard of time is determined by a crystal oscillator, an association dividing and driving circuits which may be formed of an NIOS-IC electronic circuit. During operation of the motor, electric drive signals in the form of pulses are applied to said lead terminals 6a and 7a of said drive coils 6 and 7. The pulses create magnetic fields of N.S poles and S.N. poles respectively on the magnetic pole portions 4b and 5b of said stators 4 and 5 which face the rotor thereby magnetically rotating said rotor 1 in the direction one.

This rotary power of said rotor 1 is transmitted to the gear trains of the timepiece via the pinion 1c so that the time of hour, minute and second are respectively displayed on the timepiece face (not shown).

The magnetic fields associated with said stators 4 and 5 are closed as one magnetic circuit via said rotor 1 and said cylindrical magnetic member 8 which is closed at its two ends by the end portions 4a and 5a of said stators 4 and 5.

According to the above, said cylindrical portion of said micro motor is enclosed by said cylindrical magnetic member 8, and the side end portions of said micro motor are enclosed by the end portions 4a and 5a of said stators 4 and 5. Thus the magnetic circuit of said micro motor is closed by fixing the inner end portions 8a and 8b of said magnetic member 8 to said end portions 4a and 5a.

Further, the drive mechanism of the motor which includes said stators 4 and 5 rotor 1, coupling members 2 and 3, rotor shaft 1d and so on is inserted into the inner portion of said cylindrical magnetic member 8 via the guide slit 8e.

By such a construction any external magnetic noise which would affect the accuracy of the timepiece is prevented without using a magnetic case ring and magnetic back case.

Economy of the current consumption is attained by a magnetic high electric to mechanical proof characteristic and conversion efficiency.

What we claim is:

1. An electric micro motor for use in timepieces and the like comprising: a pair of magnetic stator pieces disposed in spaced-apart relationship from one another defining an opening therebetween, said stator pieces comprising elongated bodies having one concavely curved end portion and one other end portion, said elongated bodies being disposed in end-to-end relationship with their curved end portions spaced from and facing one another to define therebetween said opening; a coil winding wound on each said stator pieces; a rotor having a permanent magnet portion and being disposed in said opening with its permanent magnet portion magnetically coupled to said stator pieces with an air gap therebetween; a pair of non-magnetic coupling members connected to and coupling together said stator pieces and having means rotatably mounting said rotor in said opening; and a magnetic enclosure member connected to said other end portions of said elongated bodies and defining with said stator pieces an enclosure enclosing said stator pieces, rotor and coupling members and forming with said magnetic stator pieces a closed magnetic circuit for the micro motor.

2. An electric micro motor according to claim 1; wherein said other end portions of said elongated bodies have a circular profile, and said magnetic enclosure member has a hollow cylindrical configuration.

3. An electric micro motor according to claim 2, wherein said magnetic enclosure member has an axial guide slit receiving therethrough the shaft portion of said rotor so as to enable connection of said shaft portion to a drive train.

4. An electric micro motor according to claim 1; wherein said pair of coupling members are axially spaced apart along the shaft portion of said rotor and are positioned on opposite sides of said permanent magnetic portion of said rotor.

5. An electric micro motor according to claim 4, wherein said pair of coupling members each has a pair of arcuate grooves therein, and said concavely curved end portion of each stator piece has a pair of curved lateral ridges each engaged within one of the arcuate grooves in respective ones of said coupling members thereby coupling together said stator pieces in a rigid assembly.

* * * * *